(12) United States Patent
Taylor

(10) Patent No.: US 6,378,779 B1
(45) Date of Patent: Apr. 30, 2002

(54) IN-GROUND MOISTURE SENSOR

(76) Inventor: Hugh Taylor, 9100 Teasley, #19-I, Denton, TX (US) 76205

( * ) Notice: Subject to any disclaimer, the term of this patent is extended or adjusted under 35 U.S.C. 154(b) by 0 days.

(21) Appl. No.: 09/532,473

(22) Filed: Mar. 22, 2000

Related U.S. Application Data

(60) Provisional application No. 60/125,628, filed on Mar. 22, 1999.

(51) Int. Cl.$^7$ ............................ A01G 25/00; F16K 17/36
(52) U.S. Cl. ............................................ 239/63; 137/78.3
(58) Field of Search ............................... 239/63, 64, 65, 239/67; 137/78.3, 392

(56) References Cited

U.S. PATENT DOCUMENTS

| | | | |
|---|---|---|---|
| 3,374,324 A | * 3/1968 | McGrann | 137/78.3 |
| 3,981,446 A | 9/1976 | Hunter | |
| 4,274,583 A | 6/1981 | Hunter | |
| 4,657,039 A | 4/1987 | Bireley et al. | |
| 4,718,446 A | 1/1988 | Simpson | |
| 4,838,296 A | 6/1989 | Brooks | |
| 4,852,802 A | 8/1989 | Iggulden et al. | |
| 5,113,888 A | 5/1992 | Beggs | |
| 5,148,825 A | * 9/1992 | Gil et al. | 239/63 |
| 5,148,826 A | 9/1992 | Bakhshaei | |
| 5,148,985 A | 9/1992 | Bancroft | |
| 5,445,176 A | 8/1995 | Goff | |
| 5,749,521 A | 5/1998 | Lattery | |
| 5,853,125 A | * 12/1998 | Murray | 239/63 |

* cited by examiner

Primary Examiner—Lisa Ann Douglas
(74) Attorney, Agent, or Firm—Marsteller & Associates, P.C.

(57) ABSTRACT

An in-ground sensor having an exterior porous filter, a porous inner screen finer than the outer filter designed to further filter solid particles from the inner portion of the device, a float assembly with a sliding member moving upward in response to buoyant forces for activating a control device which sends a signal indicating the level of moisture within the device proportional to the level of the float. The components are preferably made of a material which is temperature and corrosion-resistant in an environment which may be constantly or repeatedly exposed to moisture and temperature variation.

3 Claims, 2 Drawing Sheets

IN-GROUND MOISTURE SENSOR

CROSS REFERENCES TO RELATED APPLICATIONS

This application follows a provisional patent application for a Rain Saver, U.S. patent application Ser. No. 60/125,628 filed Mar. 22, 1999.

BACKGROUND OF THE INVENTION a. Field of the Invention

The invention relates to sub-surface soil moisture sensors for use with irrigation systems. More particularly, the invention relates to sensors which employ the use of a float assembly and electronic means to cancel the activation of an automatic sprinkling system when sufficient moisture is in the soil, thus conserving water and preventing over-watering.

b. Description of the Prior Art

Moisture sensors have been disclosed in prior art, including those which measure moisture in the air and provide a means of transmitting a reading to a remote location, and those which measure ground moisture or soil moisture and provide a means of transmitting the reading to a remote location. Of the ground or soil moisture sensors, there are principally two types in prior art—those which use a pneumatic or pressure means and those which employ a dielectric, electro-voltaic or electrical conductivity/resistivity measurement means. Additionally, there are those type moisture measuring devices which are placed above the ground and have a "rain-catching" pan with a float-type measuring device which captures and contains rain in the pan elevating a float activating a mechanical switch, similar to a toilet tank float mechanism.

U.S. Pat. No. 5,749,521, to Lattery, discloses an apparatus for soil irrigation control comprising a control unit, a soil probe, and a temperature probe. A relative measurement of soil moisture is accomplished by measuring the voltage potential difference that occurs between the two electrodes of the soil probe while a pulse of electric current passes from one electrode to the other through the surrounding soil. Lattery also incorporates a temperature probe to help compensate for the fact that the apparent resistance of an electrolyte, which the soil medium is assumed to be for these type of devices, decreased with increasing temperature in a very significant manner, due primarily to increasing ion mobility with increasing temperature. Specifically, it is typically estimated that, regardless of ion type, a two percent per degree Celsius change in resistivity is experienced. In order for systems such as Lattery to operate properly, the soil sensor must be in intimate contact with the soil. This present a problem in soil systems where there is a significant clay component. Clay expands and contracts in response to temperature and moisture content variations. Thus, as clay soils dry and contract, they may loose contact with the sensor. Thus, the resistance to the circuit would be increased. The contact may not be re-established when the soil is wetted. Therefore, although the clay soil may be damp, the resistivity would still apparently be high, calling for moisture even when it was not needed. In addition, as noted by Bancroft in U.S. Pat. No. 5,148,985, col. 1, line 51, such sensors tend to rather quickly degrade or corrode. This degrading or corroding causes increased sensor resistance which renders the sensor virtually useless.

Hunter, U.S. Pat. No. 3,981,446, discloses a water operated control apparatus and method based on the principle that air will bubble through dry soil easier than it will bubble through wet soil. It is known that certain materials, such as soil, may allow air to pass therethrough when dry, but prevent the passage of air therethrough when saturated with water. Devices incorporating such moisture sensitive air valves are known in the art. They comprise porous ceramic or plastic materials which have the ability to pass air or not, depending on the amount of their water saturation. The device disclosed by Hunter utilizes this principle to control whether a sprinkler system is turned on or not. The air valve is disposed in the ground, and, in contact therewith, absorbs water from the soil. If the soil is sufficiently saturated, air will not pass through the air valve theoretically. The problem with devices such as that disclosed by Hunter are that where the water is not soft water, i.e., contains a large amount of dissolved minerals and the like, they tend to become clogged. Once they become clogged, they do not operate at all.

Therefore, there is a need for in-ground soil moisture sensor, which overcomes the various disadvantages of the prior art.

SUMMARY OF THE INVENTION

The invention is an in-ground sensor having an exterior porous filter, a porous inner screen finer than the outer filter designed to further filter solid particles from the inner portion of the device, a float assembly with a sliding member moving upward in response to buoyant forces, and an electronic means for communication with a control device which sends a signal indicating the level of moisture within the device proportional to the level of the float. The components of the invention are preferably made of a material which is temperature and corrosion-resistant in an environment which may be constantly or repeatedly exposed to moisture and dramatic temperature variation.

The present invention is buried underground. As moisture in the soil increases, it migrates through the exterior filters into a cylindrical void space defined by a inner screen filter. The amount of water standing in the void space lifts a float via buoyancy. Once the float is lifted to a preset level, it can be inferred that soil moisture is adequate, and a contact is disengaged preventing the sprinklers from operating.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein.

DETAILED DESCRIPTION OF PREFERRED EMBODIMENTS

Figure 1:
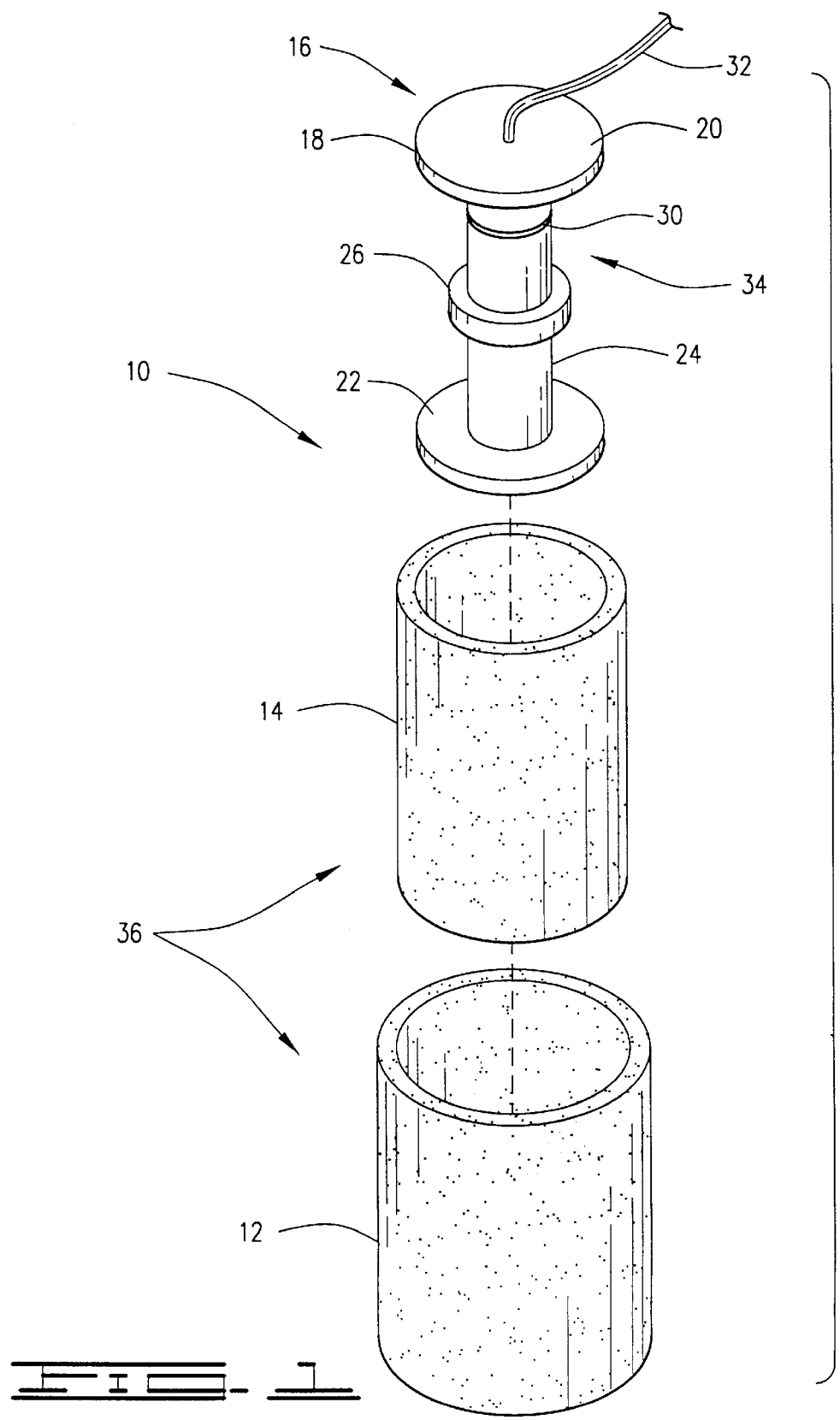
FIG. 1 is a cross-sectional view of the invention.
Figure 2:
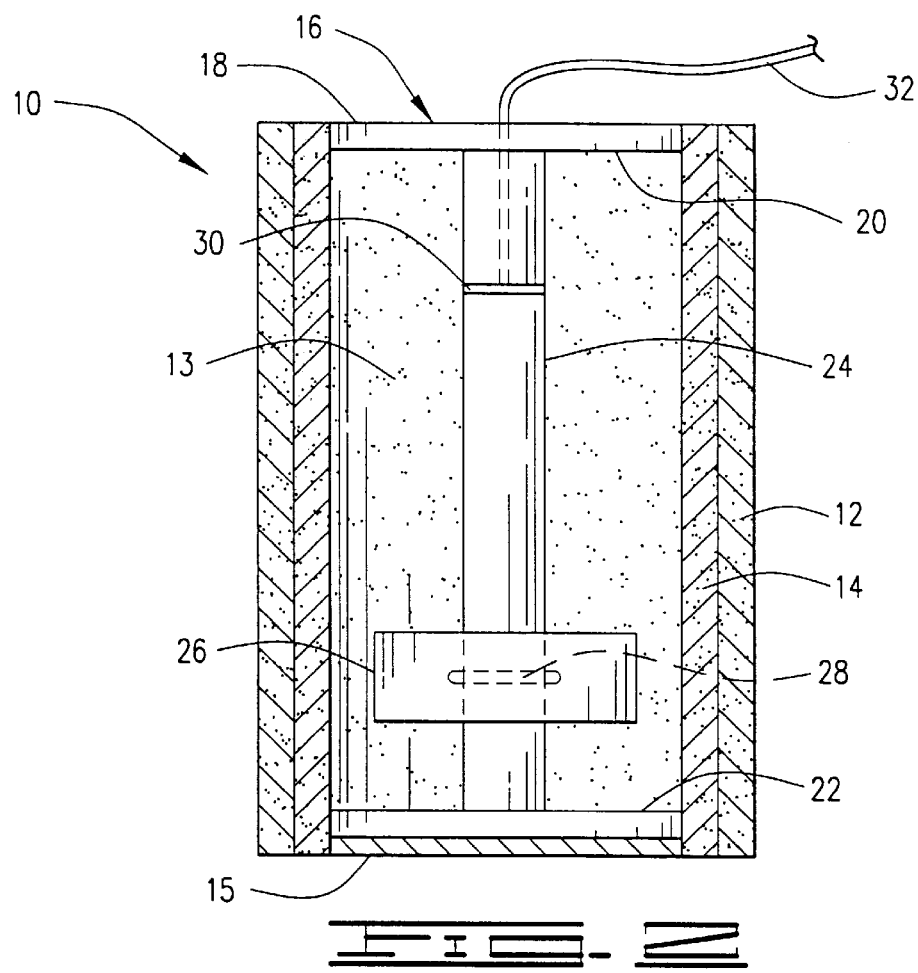
FIG. 2 is an exploded perspective view of the components of the invention.
Figure 3:
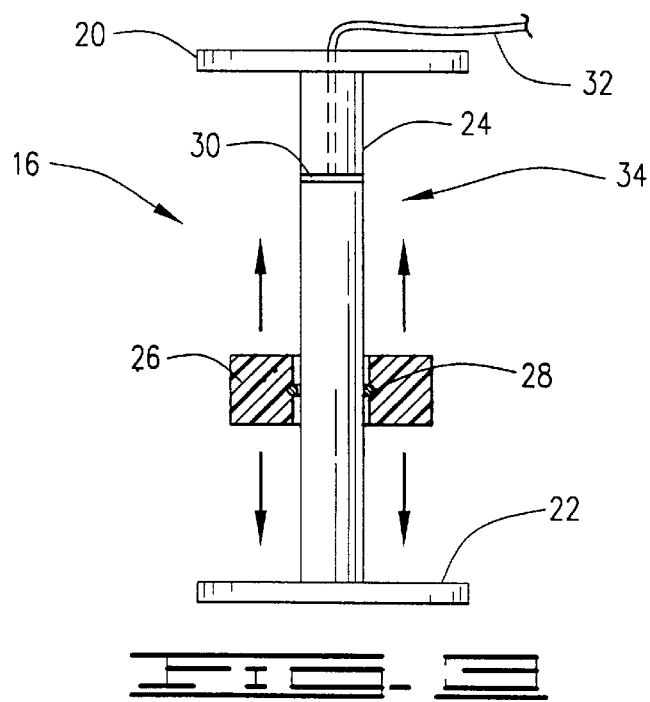
FIG. 3 is a view of the float assembly with a sliding member.

The in-ground moisture sensor 10 is a water conservation device which may be utilized as a component for irrigation or sprinkler systems. The in-ground moisture sensor 10 incorporates a filter means 36. Preferably, the filter means 36 comprises a coarse, hollow cylindrical shaped outer foam filter 12, a fine liquid porous rigid inner screen filter 14 of a slightly smaller diameter than the outer foam filter 12 and received therein, and a float assembly 16 which is inserted within the inner screen filter 14 in a cylindrical void space 13 defined thereby.

The liquid porous rigid inner screen filter 14 is also a hollow cylindrical shape and is provided with a bottom 15. The inner screen filter 14 is to be used with the outer foam filter 12 completely surrounding the inner screen filter 14.

The float assembly 16 includes a pedestal 18 and a float ring 26. The pedestal 18 is cylindrical and has a top portion 20 and a bottom portion 22 slightly smaller in diameter than the inner screen filter 14 into which it is to be inserted. Between the top and bottom portions 20, 22 of the pedestal 18 is a cylindrical pedestal shaft 24 of substantially smaller diameter than the top and bottom portions 20, 22 of the pedestal 18. The float ring 26 is a donut-shaped, buoyant element and is slidably engaged with the pedestal shaft 24, being slightly larger in diameter than the diameter of the pedestal shaft 24, but smaller than the diameter of the top and bottom portions 20, 22 of the pedestal 18.

OPERATION OF APPARATUS

The In-ground moisture sensor 10 is placed in the soil and connected to an irrigation or sprinkler system by wiring 32. As the soil surrounding the in-ground moisture sensor 10 gains water, that water flows through the outer foam filter 12 and the inner screen filter 14 reaching the float assembly 16. As the water within the In-ground moisture sensor 10 rises, the float ring 26 rises up the pedestal shaft 24 and eventually, at a certain level, has an activation means 34 for opening the circuit via the wiring 32 to the irrigation or sprinkler system that the water has reached a level certain and an interrupt signal is received by such system preventing the irrigation or sprinkler system from engaging at such time.

As the water in the soil decreases or the soil dries, the water within the In-ground moisture sensor 10 recedes, thus lowering the float ring 26 and closes the circuit to the irrigation or sprinkler system thus allowing the system to again become active.

In a preferred embodiment, the activation means for sending the signal to the irrigation or sprinkler system comprises an electric or magnetic shaft contact 30 placed on the pedestal shaft 24 and an electric or magnetic float ring contact 28 placed on the float ring 26. When the two magnet or electric contacts 28, 30 are adjacent or in contact, such contact could activate a circuit provided by the wiring 32, and such signal could interrupt the electric current to the irrigation or sprinkler system water control valve to which it could be attached.

The adjustment of this in-ground moisture sensor 10 depends on how far below the soil surface it is buried. The In-ground moisture sensor 10 should be place in a relatively neutral area or one that is neither normally too wet or too dry for it to function properly. If it is found that the in-ground moisture sensor 10 allows too much or too little water to be distributed on the ground, then the in-ground moisture sensor 10 should be raised for less water, or lowered for more water.

Having thus described the field of the invention, the prior art, the attached drawings, the summary of the invention, and the detailed description of the preferred embodiments, I claim:

1. An in-ground moisture sensor comprising:
    a. a filter means for allowing moisture into a chamber defined therein;
    b. a pedestal assembly having a top and bottom to enclose the chamber and a shaft passing there between, within the chamber;
    c. a float ring slidingly engaging the shaft; and
    d. an activation means for disengaging a circuit when water in the chamber raises the float to a predetermined level.

2. The sensor of claim 1, the filter means comprising a coarse outer filter and a fine inner filter received therein.

3. The sensor of claim 1, the activation means comprising cooperating contacts on the shaft and float, such that when the contacts are engaged, the circuit is opened disengaging the sprinkler system.

* * * * *